(12) United States Patent
Gruber

(10) Patent No.: US 12,571,738 B2
(45) Date of Patent: Mar. 10, 2026

(54) APPARATUS AND METHOD FOR AUTOMATIC MONITORING OF LIDS OF BEVERAGE AND FOOD CANS

(71) Applicant: QUISS QUALITÄTS-INSPEKTIONSSYSTEME UND SERVICE GMBH, Puchheim (DE)

(72) Inventor: Bernhard Gruber, Stockdorf (DE)

(73) Assignee: QUISS QUALITÄTS-INSPEKTIONSSYSTEME UND SERVICE GMBH, Puchheim (DE)

( * ) Notice: Subject to any disclaimer, the term of this patent is extended or adjusted under 35 U.S.C. 154(b) by 52 days.

(21) Appl. No.: 18/692,555

(22) PCT Filed: Sep. 16, 2022

(86) PCT No.: PCT/EP2022/075751
§ 371 (c)(1),
(2) Date: Mar. 15, 2024

(87) PCT Pub. No.: WO2023/041696
PCT Pub. Date: Mar. 23, 2023

(65) Prior Publication Data
US 2024/0369496 A1 Nov. 7, 2024

(30) Foreign Application Priority Data
Sep. 17, 2021 (DE) ..................... 10 2021 210 370.7

(51) Int. Cl.
*G01N 21/90* (2006.01)
*G01N 21/88* (2006.01)
(Continued)

(52) U.S. Cl.
CPC ....... *G01N 21/909* (2013.01); *G01N 21/8806* (2013.01); *G01N 21/9036* (2013.01);
(Continued)

(58) Field of Classification Search
CPC ............ G01N 21/909; G01N 21/8806; G01N 21/9036; G01N 21/9027; G01N 21/9054;
(Continued)

(56) References Cited

U.S. PATENT DOCUMENTS 5,120,126 A * 6/1992 Wertz ................... G01N 21/909
250/226
5,134,278 A * 7/1992 Nelen .................. G01N 21/909
356/240.1
(Continued)

FOREIGN PATENT DOCUMENTS

DE 10 2005 016 684 A1 10/2006
EP 0 493 487 B1 5/1996
(Continued)

OTHER PUBLICATIONS

International Search Report issued in Int'l Application No. PCT/EP2022/075751, mailed Feb. 6, 2023, 6 pages.
(Continued)

*Primary Examiner* — Timothy R Newlin
(74) *Attorney, Agent, or Firm* — McDonnell Boehnen Hulbert & Berghoff LLP

(57) ABSTRACT

A device includes a camera, which captures images of moving objects, lighting units, and a controller. The camera captures recordings of the moving objects in series during transportation on the conveyor, so that a first recording of the object in a first position and a second recording of the object in a second position are obtained. The first and second positions of the object differ by the movement of the conveyor by a corresponding offset. The illumination units
(Continued)

are composed of a dark-field illumination unit and a bright-field illumination unit, which are controlled synchronously with the camera by the controller such that the first recording generates a first contrast by a first specific control of the dark-field illumination unit and bright-field illumination unit, and in that the second recording generates a second contrast by a second specific activation of the dark-field illumination unit and bright-field illumination unit.

13 Claims, 7 Drawing Sheets

(51) Int. Cl.
*H04N 23/74* (2023.01)
*G01N 21/84* (2006.01)
(52) U.S. Cl.
CPC ....... *H04N 23/74* (2023.01); *G01N 2021/845* (2013.01); *G01N 2021/8825* (2013.01); *G01N 21/9027* (2013.01); *G01N 21/9054* (2013.01)
(58) Field of Classification Search
CPC ..... G01N 2021/845; G01N 2021/8825; G01N 21/8851; G01N 2201/1042; H04N 23/74
See application file for complete search history.

(56) References Cited

U.S. PATENT DOCUMENTS

| | | | | |
|---|---|---|---|---|
| 5,450,201 A | * | 9/1995 | Katzir | G02B 27/28 356/369 |
| 5,982,921 A | * | 11/1999 | Alumot | G01N 21/94 382/318 |
| 6,022,124 A | * | 2/2000 | Bourn | G03B 15/03 362/231 |
| 6,198,529 B1 | * | 3/2001 | Clark, Jr. | G01N 21/95684 356/394 |
| 6,437,357 B1 | * | 8/2002 | Weiss | G01N 21/896 250/559.46 |
| 6,519,356 B1 | * | 2/2003 | Hooker | G01N 21/9054 209/524 |
| 7,551,274 B1 | * | 6/2009 | Wornson | G01N 21/896 356/429 |
| 2004/0207836 A1 | * | 10/2004 | Chhibber | G01N 21/8806 356/237.4 |
| 2005/0025350 A1 | * | 2/2005 | Engelbart | G01N 21/94 382/141 |
| 2005/0259245 A1 | | 11/2005 | Cemic et al. | |
| 2007/0057184 A1 | * | 3/2007 | Uto | H01J 37/226 250/307 |
| 2007/0263206 A1 | * | 11/2007 | LeBlanc | G01N 21/896 356/239.7 |
| 2008/0174780 A1 | * | 7/2008 | Kreh | G01N 21/95607 356/402 |
| 2009/0010059 A1 | | 1/2009 | Drexler et al. | |
| 2009/0323052 A1 | * | 12/2009 | Silberstein | G01N 21/9501 356/237.5 |
| 2012/0044344 A1 | * | 2/2012 | Zheng | G01N 21/88 348/93 |
| 2013/0128026 A1 | * | 5/2013 | Hirose | G01N 21/8903 348/125 |
| 2015/0369752 A1 | * | 12/2015 | Honda | G01N 21/9501 356/237.2 |
| 2017/0365049 A1 | * | 12/2017 | Ioachim | B28B 1/523 |
| 2018/0130197 A1 | * | 5/2018 | Weiss | H04N 9/8205 |
| 2018/0213134 A1 | * | 7/2018 | Wu | H04N 23/56 |
| 2019/0096057 A1 | * | 3/2019 | Allen | G06T 7/0008 |
| 2019/0178812 A1 | * | 6/2019 | Richard | G01N 21/8806 |
| 2020/0134773 A1 | * | 4/2020 | Pinter | G01N 21/8806 |
| 2021/0097675 A1 | * | 4/2021 | Koga | G01N 21/8806 |
| 2024/0401932 A1 | * | 12/2024 | Garin | H04N 23/56 |

FOREIGN PATENT DOCUMENTS

| | | |
|---|---|---|
| EP | 0 729 572 B1 | 4/2004 |
| WO | 2011/055397 A1 | 5/2011 |
| WO | 2017207116 A1 | 12/2017 |
| WO | 2018/017575 A2 | 1/2018 |

OTHER PUBLICATIONS

Written Opinion issued in Int'l Application No. PCT/EP2022/075751, mailed Feb. 6, 2023, 9 pages.

\* cited by examiner enlarged view

41

LED diodes  4 1

Diffusor 50

42

42 separating strips, 43
conically formed

44

42

20

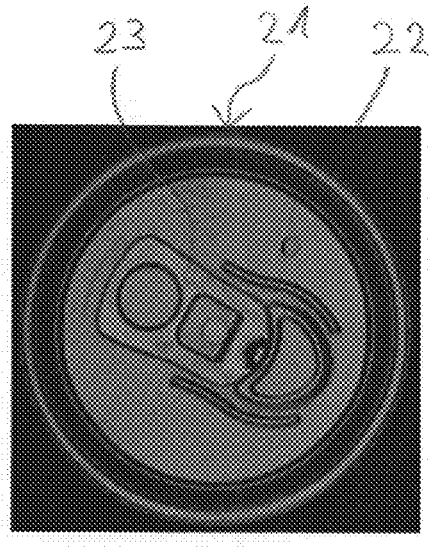
FIG. 5a
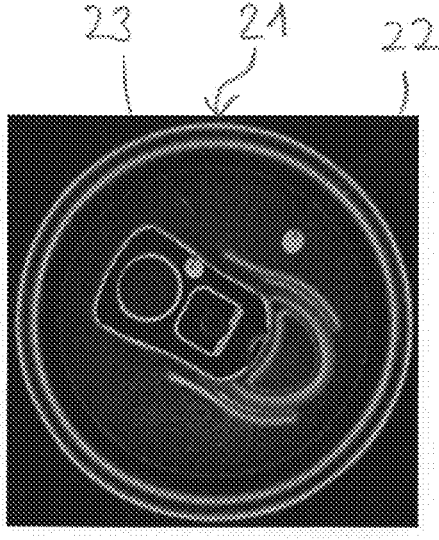
FIG. 5b
camera field of view
picture 3
picture 2
picture 1
FIG. 6

APPARATUS AND METHOD FOR AUTOMATIC MONITORING OF LIDS OF BEVERAGE AND FOOD CANS

FIELD

The present invention relates to a method and a device which enables automated optical inspection of three-dimensional objects, predominantly metallic lids and containers of beverage cans, in the ongoing production process.

BACKGROUND

In fully automated production, cans and can lids are manufactured from the raw material (steel or aluminum coils or sheets, known as "coils" or "metal sheets") to the finished product—without any manual work—and packaged ready for dispatch. Quality control must therefore also be fully automated. It is necessary to detect faulty parts and automatically remove them from the production process or eject them without stopping the production device and to detect changes in production at an early stage in order to prevent a high level of rejects.

Video inspection systems have been used for this purpose since the introduction of digital image recording using CCD cameras (today mainly CMOS cameras) and since the introduction of computer technology. With lighting elements, today mainly in the form of LED arrays, the moving objects are illuminated for a brief moment at the right time (in the usec. range) and the camera(s) are exposed synchronously. The object moving on conveyor belts (can or can lid) is imaged sharply, i.e. without "blurring", due to the short illumination and exposure time despite the high speed (no significant movement in a short period of e.g. 20 μsec).

The defects to be detected on the surfaces of the objects or production deviations can be divided into three categories:

Structural Defects

These are defects that change the direction of reflection. This category includes, for example, scratches, deformations, dents, dings, cracks, burrs and similar.

Surface Defects

These include defects that change the reflective strength. These are, for example: soiling, printing errors, color deviations, contamination (e.g. with oil), compound errors and similar.

Geometric Errors

These include errors such as ovality, diameter of rivet or cover, angle of rotation of tab and similar.

Current inspection systems can only contrast a limited number of defect types with one camera and one of the types of illumination listed above for fast-moving objects. In order to be able to contrast all defect types, several cameras are integrated in the known systems or the various contrasting methods are realized in several, serially executed inspection stations.

The test objects can be can lids, for example, and are transported on the conveyor belt at a speed of up to 6 meters/second. With the resolution required for defect detection of e.g. 1/10 mm per pixel and an object size of e.g. 100 mm, this corresponds to a number of at least 1,000×1,000 pixels. Up to now, a camera could realize a frame rate of e.g. 100 Hz. This corresponds to a time interval of 10 ms and, at an object speed of 6 m/s, a corresponding distance of 60 mm. This means that no more than one image per object could be taken with one camera. Accordingly, according to the state of the art, either several cameras are/were used in separate inspection stations or several cameras in one station with, for example, a divider mirror to divide the field of view for several cameras. This either has the disadvantage that, for example, two stations require twice the conveying distance for the inspection in the case of serially arranged inspection stations or, in the case of an arrangement with divider mirrors, the light output is halved by the divider mirrors. In addition, it is not possible to take any number of images in series with the two devices according to the state of the art.

SUMMARY

Therefore, the object of the present invention is to realize a method and a device that enables the detection of defects or production deviations of all or at least several types of defects with only one optical setup and only one camera.

The object is solved by the objects of the independent claims. Advantageous further embodiments of the invention are given in the dependent claims, the description and the accompanying figures. In particular, the independent claims of one category of claims can also be further developed analogously to the dependent claims of another category of claims.

According to the invention, the device comprises for the automated optical inspection of a plurality of three-dimensional inspection objects (20), in particular lids and containers of beverage or food cans, in the ongoing production process, which are movable via a conveyor device (30):

a camera that captures digital images of the moving test objects, a variety of lighting units, and a controller to control the camera and lighting units, wherein the camera captures at least two digital image recordings of the moving test objects in series during transportation on the conveyor device, so that a first digital image recording of the test object (20) in a first position and a second digital image recording of the test object (20) in a second position are obtained, wherein the first and second positions of the test object (20) differ from one another due to the movement of the conveyor device (30) by means of a corresponding offset, and wherein the plurality of illumination units (12) are composed of at least one or more dark-field illumination units (13) and one or more bright-field illumination units (14), which are each controlled synchronously with the camera (11) by the controller (15) in such a way that the first image recording generates a first contrast for detecting a first type of defect by a first specific control of the dark-field illumination units (13) and the bright-field illumination units (14), and in that the second image recording generates a second contrast for detecting a second type of defect by a second specific actuation of the dark-field illumination units (13) and the bright-field illumination units (14), the first and second specific actuation of the dark-field illumination units (13) and bright-field illumination units (14) differing from one another with the formation of the first and second contrast.

The underlying insight of the present invention is that with only one optical setup and only one camera, several defect types or defect categories can be detected by specifically controlling the dark-field illumination units (13) and the bright-field illumination units (14) depending on the defect type to be detected or defect category.

Further embodiments and further embodiments are shown in the sub-claims and in the description with reference to the figures.

According to a preferred embodiment, the dark-field illumination units (13) can be variably controlled by the controller (15) for individual image recordings, so that the contrast of the image recordings can be varied in order to determine a specific type of defect.

According to a further embodiment, the bright field illumination units (14) can be variably controlled by the controller (15) for individual image recordings, so that the contrast of the image recordings can be varied in order to determine a specific type of defect.

According to a further preferred embodiment, the dark-field illumination units (13) and the bright-field illumination units (14) can each be variably controlled by the controller (15) for individual image recordings, so that the contrast of the image recordings can be varied in order to determine a specific type of defect.

Furthermore, it is advantageous if the illumination units (12) comprise, in addition to the dark field illumination units (13) and the bright field illumination units (14), a mirrored coaxial illumination (16) by means of a half-mirror (17), which can be variably controlled by the controller (15) for individual image recordings, so that the contrast of the image recordings can be varied in order to be able to check the test object by means of improved illumination.

According to a preferred embodiment, the camera (11) takes three or more digital image recordings of the moving test objects (20) in series during transportation on the conveyor device (30), so that a first digital image recording of the test object (20) in a first position and a second digital image recording of the test object (20) in a second position and a third digital image recording of the test object (20) in a third position are obtained, the first, second and third positions of the test object (20) differing in each case by the movement of the conveyor device (30) by means of a corresponding offset in each case.

Furthermore, it is advantageous if the controller (15) comprises a burst mode for controlling the illumination units (12), by means of which the dark-field illumination units (13), the bright-field illumination units (14) and/or the reflected coaxial illumination (16) are supplied with illumination pulses for several successive illuminations in series, synchronized in time with the image acquisition.

According to a further preferred embodiment, the dark-field illumination units (13) are composed of individual modules which can be stacked on top of one another in the vertical direction in such a way that a cylindrical, oval or polygonal shape is formed, the viewing direction of the camera (11) being arranged essentially in the center of the cylindrical, oval or polygonal shape of the individual modules of the dark-field illumination units (13), so that any number of modules can be used.

According to a further embodiment, the bright-field illumination units (14) are arranged extending in a horizontal direction, the viewing direction of the camera (11) being provided in a vertical direction through an opening of the bright-field illumination units (14).

Furthermore, it is advantageous if a diffuser (50) is provided between the test objects (20) to be monitored and the dark-field illumination units (13) and the bright-field illumination units (14), through which the light emissions of the dark-field illumination units (13) and the bright-field illumination units (14) are scattered.

According to a further embodiment, the individual modules of the dark-field illumination units (13) are annular, oval or polygonal in shape, with at least one circular or completely or partially circumferential row of light-emitting diodes (42) being provided in each annular, oval or polygonal module.

Furthermore, it is advantageous if the individual modules of the dark field illumination units (13) or the bright field illumination units (14) comprise several UV diodes (44) in order to be able to detect fluorescent color pigments in addition to the white light illumination.

Furthermore, it is advantageous if the individual modules of the dark-field illumination units (13) or the bright-field illumination units (14) comprise several NIR diodes (near-infrared diodes) in order to optically penetrate (transmit) color pigments (e.g. a colored print on the objects).

According to a further embodiment, the bright field illumination units (14) are arranged in concentric form around the opening of the bright field illumination units (14), wherein each individual bright field illumination unit (14) is composed of a plurality of LED diodes (41).

Furthermore, it is advantageous if the camera (11) reduces the field of view in the form of an area of interest depending on the position of the test object (20), whereby the image capture frequency is increased in accordance with the reduced field of view in order to be able to capture images more quickly. This ensures that the offset of the objects between the images is reduced as much as possible or at least kept to a minimum.

Furthermore, the invention discloses a method for the automated optical inspection of a plurality of three-dimensional test objects (20), in particular metallic lids and containers, in the ongoing production process, comprising:

Acquisition of digital images of the moving test objects (20) by means of a camera (11), illumination of the test objects (20) by means of a plurality of illumination units (12), transportation of the test objects (20) by means of a conveyor (30)

Controlling the camera (11) and the lighting units (12) by means of a controller (15), wherein the camera (11) records at least two digital images of the moving test objects (20) in series during transportation on the conveyor device (30), so that a first digital image of the test object (20) in a first position and a second digital image of the test object (20) in a second position are recorded, wherein the first and second positions of the test object (20) result from the movement of the conveyor device (30) by means of a corresponding offset, and wherein the plurality of illumination units (12) are composed of at least one or more dark-field illumination units (13) and one or more bright-field illumination units (14), which are each controlled synchronously with the camera (11) by the controller (15) in such a way that the first image recording generates a first contrast by a first specific activation of the dark-field illumination units (13) and bright-field illumination units (14), and in that the second image recording generates a second contrast by a second specific actuation of the dark-field illumination units (13) and bright-field illumination units (14), the first and second specific actuation of the dark-field illumination units (13) and bright-field illumination units (14) differing from one another to form the first and second contrast.

The above embodiments and further embodiments can be combined with each other as desired, if appropriate. Other possible embodiments, further embodiments and implementations of the invention also comprise combinations of features of the invention described above or in the following with respect to the embodiments. In particular, the skilled person will also add individual aspects as improvements or additions to the respective basic form of the present invention.

BRIEF DESCRIPTION OF THE DRAWINGS

The present invention is explained in more detail below with reference to the embodiments shown in the schematic figures in the drawings. They show:

FIG. 1a shows an embodiment of a schematic structure of a device according to the invention;

FIG. 1b shows a test object which is optically inspected by the schematic structure of the device according to the invention of FIG. 1a;

FIG. 2a shows the embodiment of the device according to the invention of FIG. 1a with a different activation of the lighting;

FIG. 2b shows the test object, which is optically inspected by the schematic structure of the device according to the invention of FIG. 2a;

FIG. 3c shows the test object which is optically inspected by the schematic structure of the device according to the invention of FIG. 3a;

FIG. 5a shows another test object in the form of a beverage can lid;

FIG. 5b shows the test object in the form of a beverage can lid from FIG. 5a with modified lighting;

FIG. 6 shows the offset of a can end with three shots in series using the device according to the invention;

In all figures, identical or functionally identical elements and devices—unless otherwise indicated—have been given the same reference signs.

DETAILED DESCRIPTION

Figures 1A, 1B:
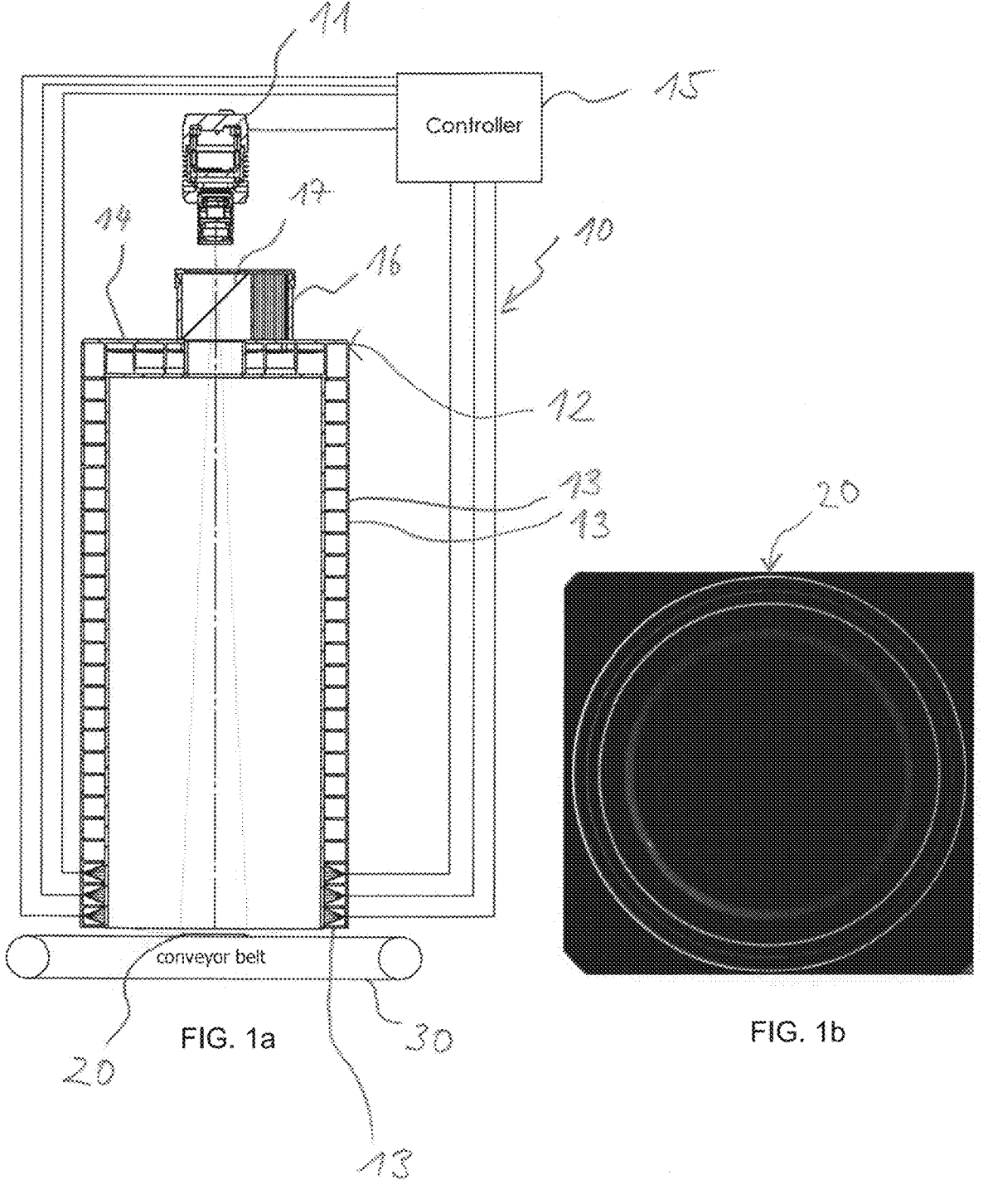

FIG. 1a shows the device 10 according to the invention as a complete test station with at least one test object 20 on a conveyor belt 30, a camera 11, illumination units 12 and a controller 15 for controlling the camera 11 and the illumination units 12, which comprises a plurality of dark-field illumination units 13 and a plurality of bright-field illumination units 14, wherein the three lowest dark-field illumination units 13 are active.

Different illumination methods are required to contrast the surfaces of the test object to be inspected. In principle, the following methods can be used for this purpose:

Dark field illumination

Bright field illumination

Coaxial lighting (reflected lighting)

Dome illumination/Cloudy Day, i.e. all illumination types dark field, bright field and coaxial illumination activated As the mostly metallic objects to be inspected, especially can lids, do not usually comprise transparency in the visible spectral range, background lighting is not required.

As explained above, test objects 20 may comprise three different categories of defects that can be detected by the device according to the invention. The structural defects (1. defect category) can be divided into high-frequency and low-frequency defects. A high-frequency defect is, for example, a scratch or a crack, which produces a very strong change in the direction of reflection. A flat surface would not be illuminated when viewed almost vertically, especially only "almost", as no parallel beam path is possible with endocentric optics, and with dark field illumination in the reflection of the surface and the surface therefore appears dark. A high-frequency error creates a strong deflection and hits the illumination.

Surface defects (2nd defect category), such as soiling, will absorb the incident light on highly reflective surfaces, i.e. there is no transmission, and appear as dark areas. However, prints or applied sealants (e.g. compound) will also absorb light, at least in part, and thus contrast with the highly reflective surface in terms of reflective strength. Furthermore, the absorption or reflection strength can differ in the spectral range, for example a green compound (sealant on a lid) will absorb blue and red light more strongly and reflect green light.

Geometric checks (3rd error category) require a contrasting of the edges and structures in order to then enable a metric check of the dimensions with "optical measuring tools", e.g. algorithms for edge scanning or edge detection, whereby a calibration or a conversion of the pixel position into a metric value is required.

According to the invention, a repetition frequency of e.g. 1,000 Hz is made possible by means of a novel camera technology, as explained below, and this corresponds to a time interval of only 1 ms. This reduces the displacement of the object at e.g. a conveying speed of 6 m/s to only 6 mm according to the invention, whereas the displacement of the test object according to the state of the art is 60 mm. Thus, a first shot of the object shortly before the perfect position at −6 mm and a second shot at perfect position at 0 mm as well as a third shot shortly after the perfect position at +6 mm are possible on the conveyor belt of the device according to the invention. It should be noted that low-frequency defects of the structural defects (1st category listed above) require exact positioning and the recording for this is realized in the perfect position. The two further recordings before and after the perfect position can also be realized with a slight offset to the perfect position. The controller 15 is used to control the respective image recordings of the camera 11 and the required lighting angles or lighting devices 12 synchronously for the best possible contrast. It is thus possible to take several images, preferably 2 or preferably 3 images, of the object to be inspected at very short intervals, preferably at an interval of 1 ms or shorter, using only one device according to the invention and only one camera. In order to take an image without blurring or motion blurring, which can be caused by the high speed of the conveyor belt 30, the image is taken in a period of a few microseconds. Preferably, exposure times of 20 to 30 μsec.

are specified by the controller 15 in order to reduce the motion blur in the image recordings of the camera 11 to a maximum of 1 pixel.

For example, the signal transmission within the camera 11 from the CMOS chip to the FPGA takes place via an LVDS interface (Low Voltage Differential System) for high reliability of data transmission at high clock rates. For the required repetition frequency and the high resolution per image, 16 or more LVDS connections are preferably used. The LUX1310 CMOS camera chip from Luxima Technology is read out via 16 LVDS interfaces and enables a refresh rate of 1,070 frames per second.

The more LVDS or Mipi lanes are connected to the sensor by the camera electronics, the faster the data is read into the internal memory, as the lanes read the data from the sensor in parallel. The maximum internal camera speed results from the interaction of sensor speed and the transfer rate of writing to the internal memory. The camera then performs operations on the image in the memory and transfers the data to the external interface.

These interfaces of industrial cameras to the outside world, such as USB, CameraLink, GigE or CoaXPress, have significantly different transmission rates. When the speed of a camera is specified for machine vision image processing, the data rate that the camera constantly delivers over a longer period of time is measured. The measurement is necessarily carried out via the camera 11 interface.

Each module connected downstream of the sensor can only reduce the speed of the camera. If, for example, the interface transmits slower than the sensor, the camera will only deliver the maximum data rate of the interface, but not the maximum data rate of the sensor. This means that in the long term, an industrial camera can only be triggered with the maximum data rate of the interface.

The emphasis here is on long-term (in the range of seconds). A camera with sufficient built-in internal memory can buffer images in the internal memory (at the maximum internal speed of the camera). The sensor can therefore be triggered at a higher frequency than the specified frame rate of the camera allows, provided the internal speed is higher than that of the interface. The images that follow in quick succession are saved internally and then delivered (with a delay) via the slower interface, which can be described as the burst mode of camera 11.

The size of the available memory and the internal speed of the camera are the limiting elements here—as soon as the memory is full, images are discarded (depending on the implementation) or the triggering of the sensor is prevented for the time without sufficient memory.

The illumination areas are also only controlled for 1 to 100 µsec. via the controller 15 in synchronization with the image capture and the electrical power output to the diodes is increased. This means that the diodes are overdriven by a factor of 10 to 100 for the short period in order to generate sufficient light energy. The relatively long period of e.g. 1 ms until the next image is captured and the LEDs are activated results in a pulse/pause ratio of approx. 1:49 (the LEDs are active for e.g. 20 µsec. and inactive for 980 µsec.) and thus sufficient time for the diodes 41, 42, 44 of the device according to the invention to release the thermal energy again.

It is now advantageous to also equip the controller 15 for controlling the lighting areas or lighting units 12 with a "burst mode" and to operate it in this mode, as explained above. This means that the energy for several illuminations in series (synchronized in time with the image capture) must be sufficiently dimensioned to avoid recharging between the images. After the serial recording of e.g. four images and illumination pulses at a time interval of 1 ms on an object, there is a sufficient pause of e.g. 16 ms to recharge the energy for the next series of images on the next test object, which is supplied to the field of view of the camera 11 via the conveyor belt 30.

Depending on the object speed, it is also possible with the method and the device to realize a high number of images in series (e.g. 30 images) and to combine the images to an overall image. This allows the surface of the object to be scanned from an angle range of 0 to ±90° with a resolution of e.g. 3°.

The exposure time of the camera 11 and the lighting units 12, which are controlled synchronously with the image capture, can be precisely controlled in a time range of nanoseconds. This makes it possible to take pictures of the object with a different exposure and lighting time each time. If, for example, only one direction of illumination is activated from one direction during the first exposure (e.g. a dark field ring 13), the exposure and illumination time can be increased to 50 µsec. This ensures that sufficient light is accumulated in the specified time. If, for example, all illumination areas are activated during the subsequent exposure (dome illumination/cloudy day), the exposure and illumination time can be reduced to e.g. 5 µsec. Each shot can therefore be given its own exposure and lighting time to enable optimum contrasting. The settings are determined in a parameterization in set-up mode and stored in the controller 15. In automatic inspection mode, object detection (e.g. by a light barrier) and path tracking (e.g. rotary encoder) are used by the controller 15 to take the series shot at the right time with the previously set parameters. The images captured by the camera 11 for each test object 20 are then evaluated by an evaluation computer and the tested object 20 is classified as good, bad or warning. Defective parts are automatically ejected via the path tracking. The ejection of a test object 20 or can end on the conveyor belt 30—in particular by blowing out—is verified by means of a further check (e.g. a light barrier).

The continuous transport of the test objects 20 on the conveyor belt 30 and the resulting time offset of the images results in a different position of the test object 20. For automatic positioning of the test areas, the position of the test objects 20 in each image is localized by suitable algorithms (tracking).

In FIG. 1*a*, only the three ring-shaped dark-field illumination units 13 and none of the bright-field illumination units 14 are active. The dark-field illumination units 13 are horizontally arranged illumination units with a horizontally aligned direction of illumination, whereby the dark-field illumination can be made up of a large number of dark-field rings that can be stacked on top of each other. Different numbers of dark field illumination units 13 can be activated.

FIG. 1*b* shows the image capture of the camera 11, whereby the object contrasting is achieved with the active illumination areas of FIG. 1*a*. Here, special defects on the object contours of the test object 20 in the form of a can lid are well contrasted, such as a dent at 8 o'clock in the gray ring in the form of a bright spot, which represents a dent in the outer area. However, other types of defects are not visible or contrasted at the same time, i.e. in the identical image capture, such as defects in the center area of the can end 20, which are, however, visible in FIG. 2*b*.

Figures 2A, 2B:
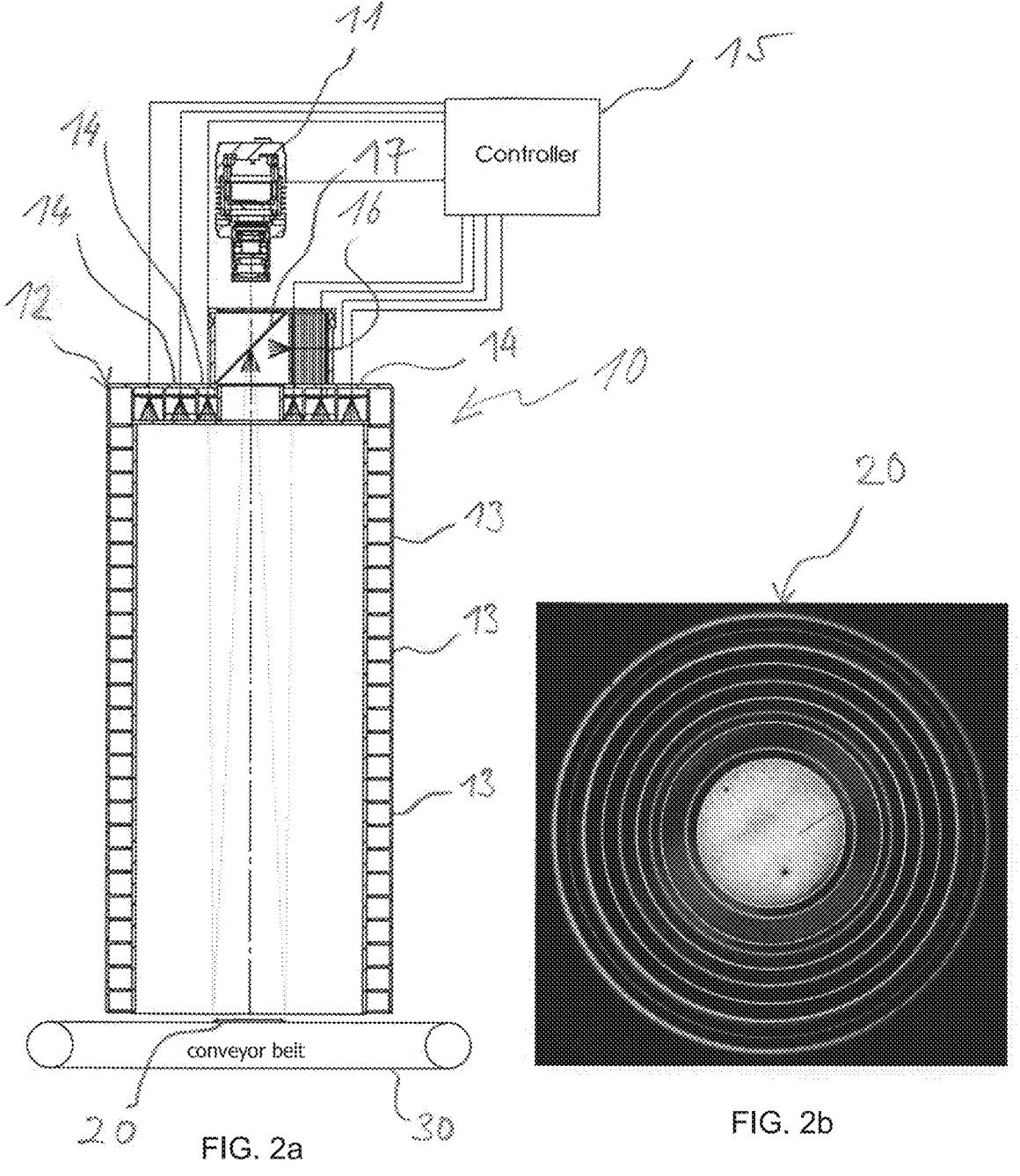

FIG. 2*a* shows the complete inspection station 10 with the inspection object 20 on the conveyor belt 30, the camera 11, illumination units 12 and the controller 15 for controlling the camera 11 and the illumination units 12, whereby three ring-shaped bright field illumination units 14 and a coaxially mirrored illumination 16 are active.

In this FIG. 2a, only the bright field illuminations are active, whereby these are the vertically arranged bright field illumination units 14 and a coaxial illumination 16 reflected into the beam path of the viewing area of the camera 11 via a half-mirror 17. Only the coaxial illumination 16 and/or a different number of the bright field illumination units 14 could also be activated.

FIG. 2b shows the contrasting of the test object 20 by means of the image recording of the camera 11, whereby the object contrasting with the active illumination areas of FIG. 2a results from the active bright field illuminations 14 and 16. In particular, low-frequency types of defect are well contrasted, as can be seen from the two black dots at 10 o'clock and 5 o'clock in the bright area of the can lid 20, with the black dot at 5 o'clock representing a dent in the bottom of the can and the black dot at 10 o'clock representing contamination. In contrast to this, however, other types of defect are not visible or contrasted at the same time, i.e. in the identical image recording, such as the bright spot at 8 o'clock in the outer area, which represents a dent that can be recognized in FIG. 1b by the dark field illumination.

Figure 3A:
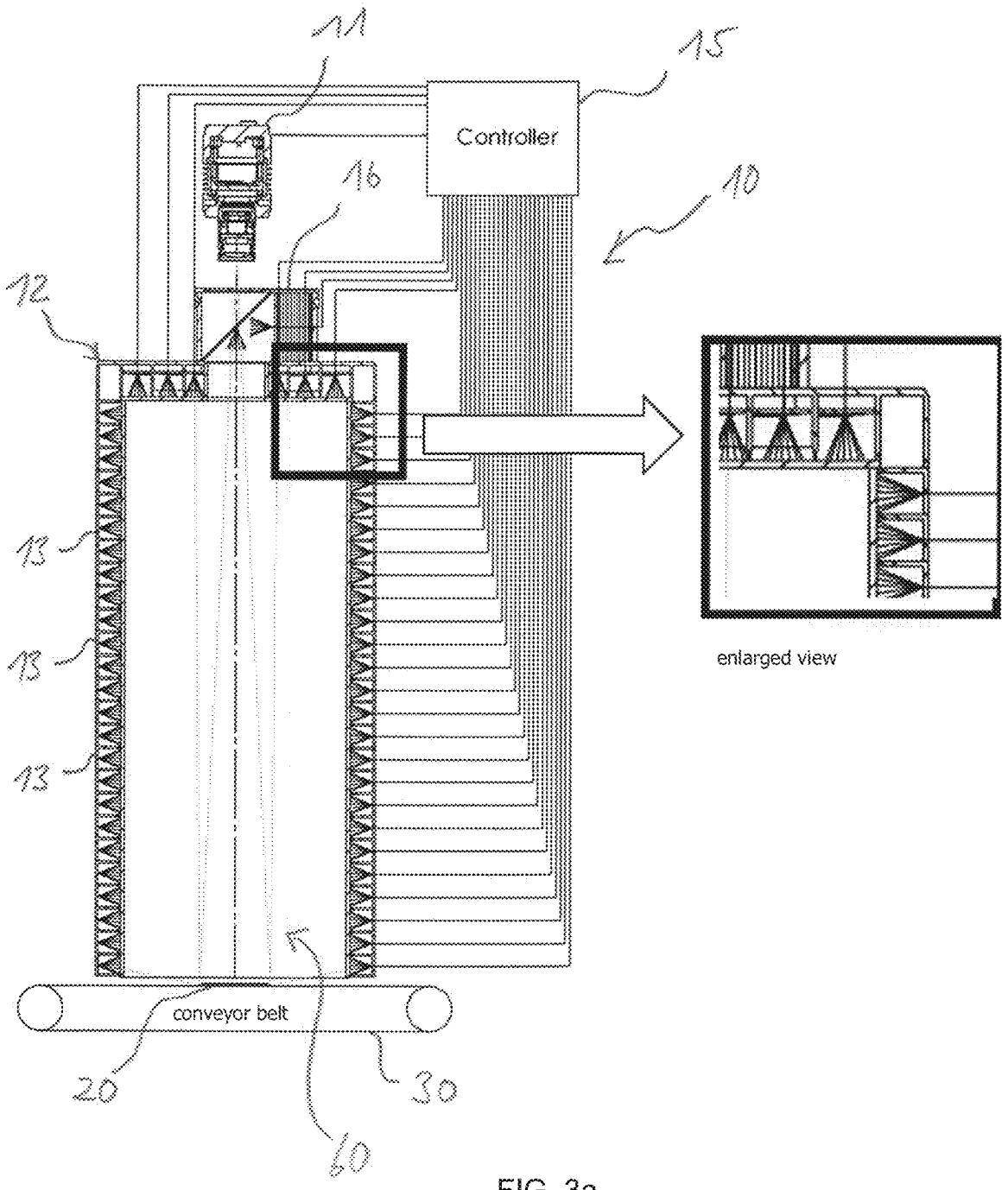
FIG. 3a shows a further embodiment of a schematic structure of a device according to the invention with an enlarged section.

FIG. 3a shows the test station 10 of FIGS. 1a and 2a according to the invention with the test object 20 on the conveyor belt 30, the camera 11, lighting units 12 and the controller 15 for controlling the camera 11 and the lighting units 12, whereby all lighting units 12 are active and thus correspond to dome lighting/cloudy day lighting.

In this FIG. 3a, all illuminations are active. These are the vertical dark-field illumination units 13 and the horizontally arranged bright-field illumination units 14 and the coaxial illumination 16 reflected into the beam path of the camera's field of view.

The schematic enlarged section from FIG. 3a shows an advantageous arrangement of the illumination diodes 41, 42, in particular white light LEDs 41, 42, in relation to the diffuser 50, which can be constructed from a horizontally arranged diffuser disk for the bright field illumination and a cylindrical diffuser for the dark field illumination. Furthermore, some illumination diodes can also be designed as UV LEDs 44 and/or NIR LEDs.

Without a structural extension of the device, it is thus also possible to realize further exposures with different types of illumination. This is, for example, an image with an arrangement of additional UV diodes 44 with a wavelength preferably in a range of 300-400 nm. This makes it possible to detect contamination of the objects by, for example, oil from a production machine (machine oil). Fluorescent pigments are added to the oil and these are excited by UV light and generate a reaction in a spectral range of 400-700 nm and this can be recorded, contrasted and recognized by the evaluation unit using synchronous image recording. Since a contamination with an oil droplet claims a relatively large area on the object (with a diameter of e.g. 3-x mm) and at the same time the fluorescence is very weak in relation to the excitation illumination (UV light), it may be advantageous to carry out the UV illumination with an additional fourth exposure and a separate and longer illumination and exposure time of e.g. 100 μsec. This causes a "blurring" of the defect (oil droplets) in the recorded image due to the movement (motion blur). However, this is not relevant for detecting the contamination (illumination by oil droplets=defect).

With NIR diodes, it is also possible to optically penetrate colored prints or lettering and thus eliminate them in the image capture, as the metallic surface of a can lid, for example, also reflects NIR light.

Figure 3B:
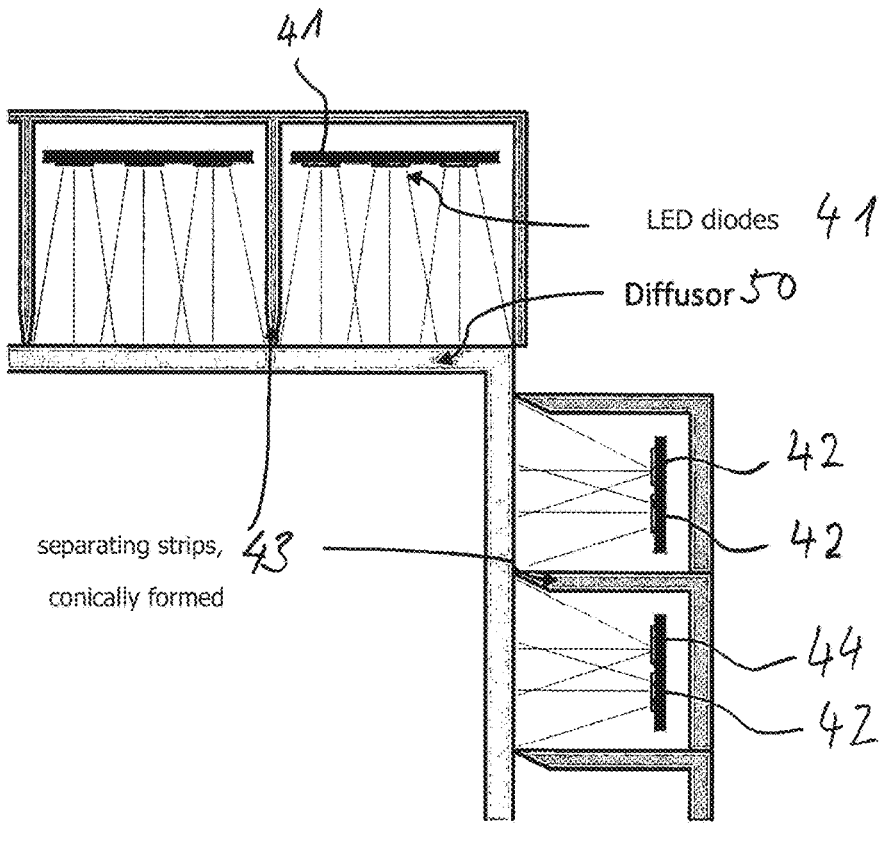
FIG. 3b shows the enlarged section of the structure of the device according to the invention of FIG. 3a with an exemplary arrangement of LED diodes.

Furthermore, FIG. 3b shows the structure of separators 43 of the activatable illumination areas, which are arranged between the individual activatable illumination units of the vertical dark-field illumination units 13 and the horizontally arranged bright-field illumination units 14.

In order to achieve uniform radiation of the point-arranged diodes 41, 42, it is advantageous not to point the diodes 41, 42 directly at the test object 20 to be illuminated, but to scatter the light via the diffuser 50. If the surface of the object 20 is highly reflective, the diodes 41, 42 arranged at specific points would be reflected without a diffuser. The distance between the diodes 41, 42 and the diffuser 50 depends on the beam angle of the diodes 41, 42 and the diffuser factor of the disk or cylinder of the diffuser 50. If adjacent illumination areas are activated in a shot, it is advantageous not to create an edge or separation of the illumination. For this purpose, conical separators 43 are used according to the invention in order to seamlessly illuminate the diffuser from both sides of a test chamber 60. This avoids a visible separating edge.

Figure 3C:
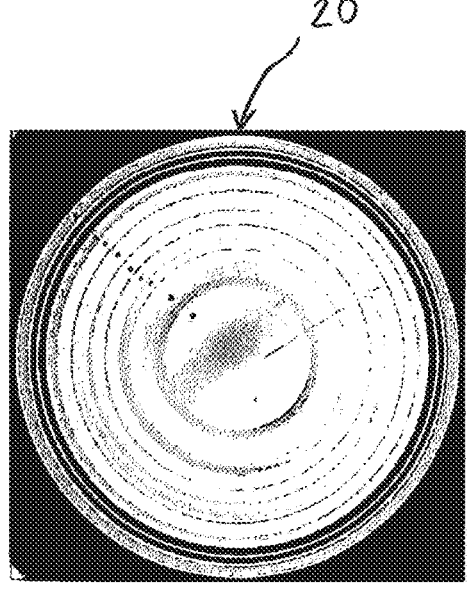

FIG. 3c shows the object contrasting with the active illumination areas of the representation in FIG. 3a. In particular, surface defects are well contrasted, such as the dot-shaped soiling arranged in a roughly linear pattern in the direction of 10 o'clock. Furthermore, a scratch in the direction of 2 o'clock can be seen from the center outwards through the dome illumination/CloudyDay. However, low-frequency defects such as dents or dings are poorly detected, such as the dent at 5 o'clock, which is clearly visible in FIG. 2b.

Figure 4:
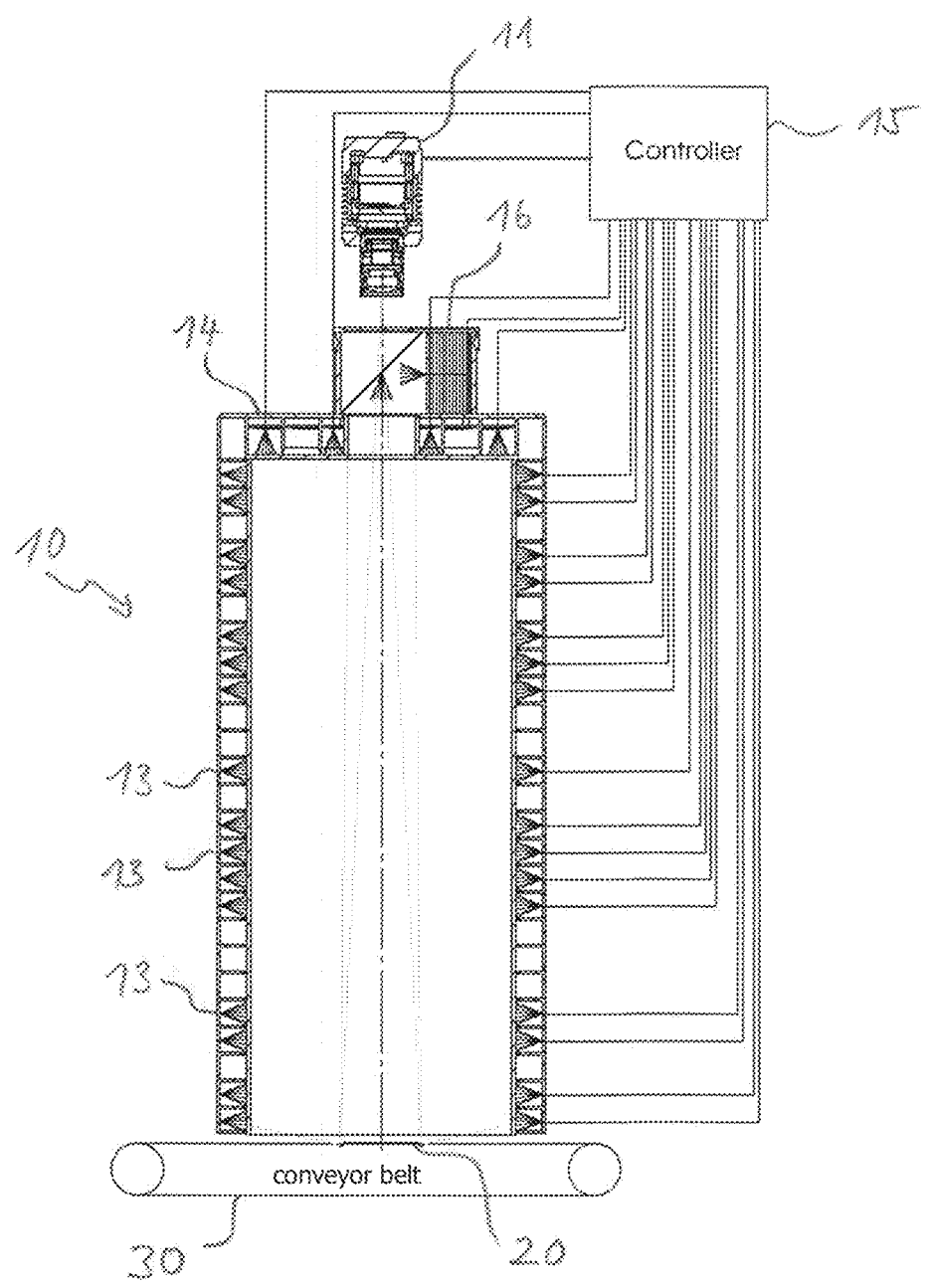
FIG. 4 shows a further embodiment of a schematic structure of a device according to the invention.

FIG. 4 shows the flexible control of different lighting areas. Depending on the shape of the object surface to be inspected, areas of the vertical dark-field illumination units 13 and the horizontally arranged bright-field illumination units 14 can be activated or deactivated for an image of the camera 11.

FIGS. 5a and 5b show a beverage can end 21 with an oil contamination. In FIG. 5a, the coaxial illumination 16 and the bright field illumination 14 of the device 10 according to the invention have been activated. The oil drop 23 on the tab in the direction of 2 o'clock is almost invisible in FIG. 5a. In FIG. 5b, UV illumination and dark field illumination 13 have been activated. The contours are very strongly emphasized and the geometric features, such as the correct diameter and the correct shape of the tab, can be checked. At the same time, the fluorescent pigments in the oil droplets 22, 23 can be excited with the UV lighting and these stand out very well as bright dots and can therefore be automatically recognized by an image capture.

FIG. 6 shows the offset of a can lid 21 with three images in series of 6 mm each by the conveyor belt 30. At a typical transport speed of e.g. 6 m/sec. and a time interval between the images of preferably 1 msec. or shorter, this results in a position difference of 6 mm per image taken by the camera 11 of the device 10 according to the invention. or shorter, this results in a position difference of 6 mm per image taken by the camera 11 of the device 10 according to the invention. Preferably, the camera chip does not have a square image format—but approximately 4:3 or 16:9—and thus the position offset of round objects, such as a can lid, can be compensated using the landscape format.

Figure 7:
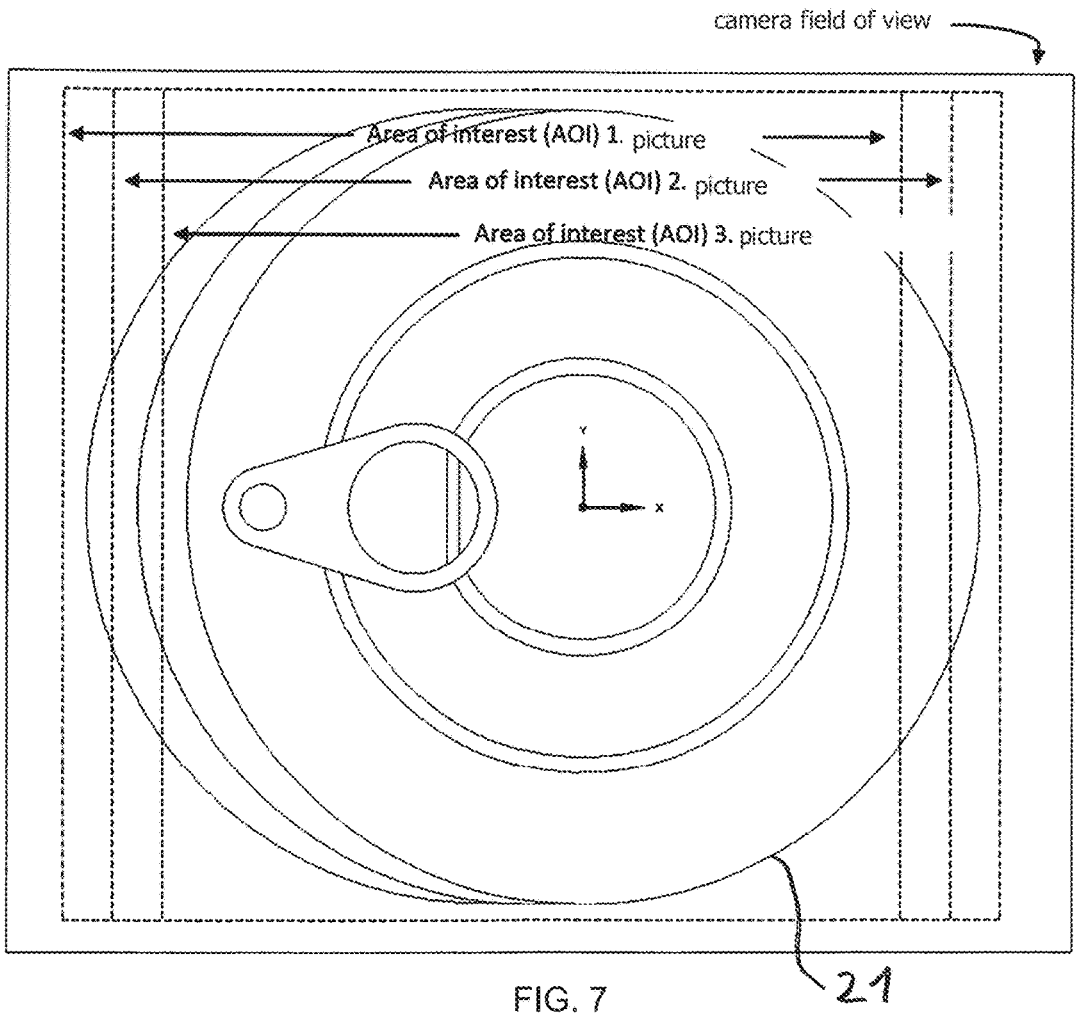
FIG. 7 shows the flexible positioning of a reduced field of view of the camera of the device according to the invention.

FIG. 7 shows a preferred flexible positioning of a can lid 21 with a reduced area of interest (AOI=Area of Interest) per image capture. The image acquisition frequency can be increased by cutting out a section of the overall image (partial scan). A faster image acquisition frequency reduces the object displacement between the images. However, since the overall view of the camera 11 must cover the test object 21 from the first to the last image, the first and last images determine the size of the entire field of view of the camera 11. Optimization can be achieved if the AOI is tailored to the respective image and "moves" with the object movement.

Optical "indexing" or positioning of the test areas is preferably compensated for by automatic position detection.

Figure 8:
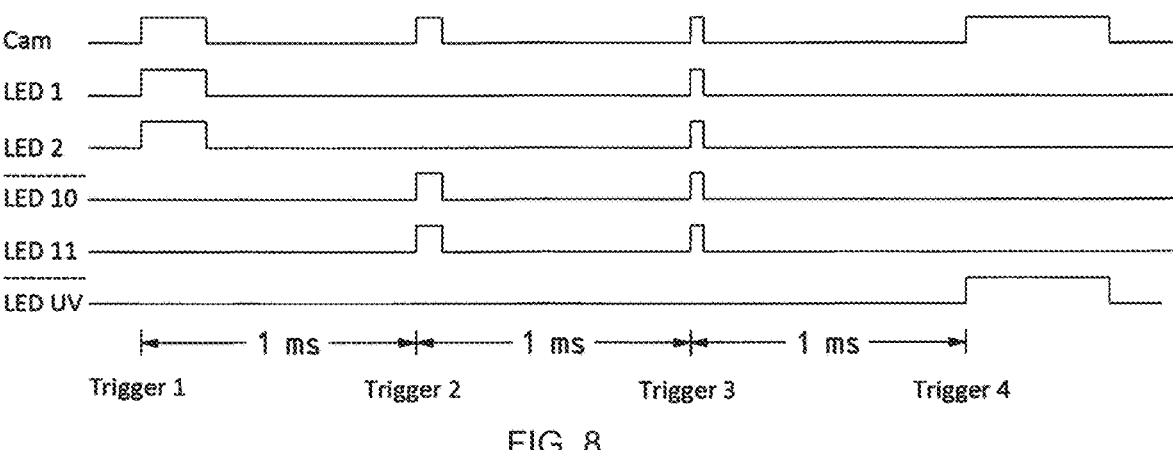
FIG. 8 shows an example of the temporal control of a sequence with 4 shots of the device according to the invention.

FIG. 8 shows an example of the temporal control of a sequence with 4 image recordings (triggers 1 to 4). In the first image, only the LED illuminations 1 and 2 are triggered, in the second image only the LED illuminations 10 and 11 are triggered and in the third image the LED illuminations 1, 2, 10 and 11 are triggered. The fourth image is, for example, the UV illumination and only this is active in the fourth image. Camera 11 is controlled synchronously with each shot. The duration of illumination and exposure is determined by the pulse length.

It is now advantageous to also operate the lighting control in burst mode. This allows light pulses to be emitted in series at very short intervals—synchronized with the camera—at a time interval of e.g. 1 ms. The sum of the power emitted per pulse from trigger one to four must not exceed the total power of the lighting control.

By using broadband white light diodes, which emit light as evenly as possible in the VIS spectral range, in combination with a color camera, it is also possible to check the correct color of the print as well as the purity of the type.

Since the devices and methods described in detail above are examples of embodiments, they can be modified to a wide extent by a person skilled in the art without departing from the scope of the invention. In particular, the mechanical arrangements and the proportions of the individual elements to one another are merely exemplary.

According to the invention, a device is described for the automated optical inspection of a plurality of three-dimensional test objects 20 in the ongoing production process, which are movable via a conveyor device 30, the device comprising:

a camera 11, which captures digital images of the moving test objects 20, a large number of lighting units 12, and a controller 15 for controlling the camera 11 and the lighting units 12, wherein the camera 11 captures at least two digital image recordings of the moving test objects 20 in series during transportation on the conveyor device 30, so that a first digital image recording of the test object 20 in a first position and a second digital image recording of the test object 20 in a second position are obtained, wherein the first and second positions of the test object 20 differ due to the movement of the conveyor device 30 by means of a corresponding offset, and wherein the plurality of illumination units 12 are composed of at least one or more dark-field illumination units 13 and one or more bright-field illumination units 14, which are each controlled synchronously with the camera 11 by the controller 15 in such a way that the first image recording generates a first contrast by a first specific control of the dark-field illumination units 13 and bright-field illumination units 14, and in that the second image recording generates a second contrast by a second specific activation of the dark-field illumination units 13 and bright-field illumination units 14, the first and second specific activation of the dark-field illumination units 13 and bright-field illumination units 14 differing from one another in the formation of the first and second contrast.

The invention claimed is:

1. A device for the automated optical inspection of a plurality of three-dimensional inspection objects, in particular metallic lids and containers of beverage and food cans, in the ongoing production process, which objects can be moved via a conveyor device, the device comprising:

a camera which captures digital images of the moving test objects, lighting units, and a controller for controlling the camera and the lighting units, characterized in that the camera captures at least two digital image recordings of the moving test objects in series during transportation on the conveyor device, so that a first digital image recording of the test object in a first position and a second digital image recording of the test object in a second position are obtained, the first and second positions of the test object differing as a result of the movement of the conveyor device by a corresponding offset, and in that the plurality of illumination units are composed of at least one or more dark-field illumination units and one or more bright-field illumination units, which are each controlled synchronously with the camera by the controller in such a way that the first image recording generates a first contrast by a first specific activation of the dark-field illumination units and bright-field illumination units, and in that the second image recording generates a second contrast by a second specific actuation of the dark-field illumination units and bright-field illumination units, the first and second specific actuation of the dark-field illumination units and bright-field illumination units differing from one another to form the first and second contrast, characterized in that the illumination units comprise, in addition to the dark-field illumination units and the bright-field illumination units, a reflected coaxial illumination by a half-mirror, which can be variably controlled by the controller for individual image exposures, so that the contrast of the image exposures can be varied.

2. The device according to claim 1, characterized in that the dark-field illumination units can be variably controlled by the controller for individual image exposures, so that the contrast of the image exposures can be varied.

3. The device according to claim 1, characterized in that the bright field illumination units can be variably controlled by the controller for individual image exposures, so that the contrast of the image exposures can be varied.

4. The device according to claim 1, characterized in that the dark-field illumination units and the bright-field illumination units can each be variably controlled by the controller for individual image exposures, so that the contrast of the image exposures can be varied.

5. The device according to claim 1, characterized in that the camera takes three or more digital image recordings of the moving test objects in series during transport on the conveyor device, so that a first digital image recording of the test object in a first position and a second digital image recording of the test object in a second position and a third digital image recording of the test object in a third position are obtained, the first, second and third positions of the test object differing due to the movement of the conveyor device by a corresponding offset in each case.

6. The device according to claim 1, characterized in that the controller for controlling the illumination units comprises a burst mode, by which the dark-field illumination units, the bright-field illumination units and/or the reflected coaxial illumination for a plurality of illuminations in series are supplied with illumination pulses in a time-synchronized manner for image acquisition.

7. The device according to claim 1, characterized in that the dark-field illumination units are constructed from individual modules which can be stacked on top of one another in the vertical direction in such a way that a cylindrical, oval or polygonal shape is produced, the viewing direction of the camera being arranged essentially in the center of the cylindrical, oval or polygonal shape of the individual modules of the dark-field illumination units.

8. The device according to claim 1, characterized in that the bright-field illumination units are arranged parallel to the conveying direction of the test objects, the viewing direction of the camera being provided through an opening of the bright-field illumination units.

9. The device according to claim 1, characterized in that a diffuser is provided between the test objects and the dark-field illumination units and the bright-field illumination units, through which diffuser the light emissions of the dark-field illumination units and the bright-field illumination units are scattered.

10. The device according to claim 1, characterized in that the individual modules of the dark-field illumination units are of annular, oval or polygonal construction, at least one complete or partially circumferential row of light-emitting diodes being provided in each annular, oval or polygonal module.

11. The device according to claim 1, characterized in that the individual modules of the dark field illumination units comprise a plurality of UV diodes.

12. The device according to claim 1, characterized in that the bright field illumination units are arranged in concentric form around an opening of the bright field illumination units, wherein each individual bright field illumination unit is composed of a plurality of LED diodes.

13. A device for the automated optical inspection of a plurality of three-dimensional inspection objects, in particular metallic lids and containers of beverage and food cans, in the ongoing production process, which objects can be moved via a conveyor device, the device comprising:

a camera which captures digital images of the moving test objects, lighting units, and a controller for controlling the camera and the lighting units, characterized in that the camera captures at least two digital image recordings of the moving test objects in series during transportation on the conveyor device, so that a first digital image recording of the test object in a first position and a second digital image recording of the test object in a second position are obtained, the first and second positions of the test object differing as a result of the movement of the conveyor device by a corresponding offset, and in that the plurality of illumination units are composed of at least one or more dark-field illumination units and one or more bright-field illumination units, which are each controlled synchronously with the camera by the controller in such a way that the first image recording generates a first contrast by a first specific activation of the dark-field illumination units and bright-field illumination units, and in that the second image recording generates a second contrast by a second specific actuation of the dark-field illumination units and bright-field illumination units, the first and second specific actuation of the dark-field illumination units and bright-field illumination units differing from one another to form the first and second contrast, characterized in that the camera performs a reduction of the field of view in the form of an area of interest depending on the position of the test object, the image recording frequency being increased in accordance with the reduced field of view.

* * * * *